US005963143A

United States Patent [19]

Tada

[11] Patent Number: 5,963,143

[45] **Date of Patent: *Oct. 5, 1999**

[54] DISPLAY OF TIMER FOR PROGRAMMING MODE OF A RADIO SELECTIVE CALLING RECEIVER

[75] Inventor: Ken-ichi Tada, Shizuoka, Japan

[73] Assignee: NEC Corporation, Tokyo, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/747,649

[22] Filed: Nov. 13, 1996

[30] Foreign Application Priority Data

Nov. 13, 1995 [JP] Japan .................................... 7-294093

[51] Int. Cl.[6] ........................................................ H04Q 1/00

[52] U.S. Cl. ................................ 340/825.44; 340/309.15; 368/47

[58] Field of Search .......................... 340/825.44, 309.15; 368/10, 47

[56] References Cited

U.S. PATENT DOCUMENTS

| | | | |
|---|---|---|---|
| 4,134,660 | 1/1979 | Sakurada | 340/309.15 |
| 4,365,289 | 12/1982 | Small | 340/309.15 |
| 4,763,493 | 8/1988 | Nishite | 340/309.15 |
| 4,803,854 | 2/1989 | Kikushi | 340/309.15 |
| 4,805,722 | 2/1989 | Keating | 340/309.15 |
| 4,920,333 | 4/1990 | Barr | 340/309.15 |
| 5,046,157 | 9/1991 | Smith | 340/309.15 |
| 5,434,563 | 7/1995 | Kudoh | 340/825.44 |
| 5,442,348 | 8/1995 | Mushell | 340/309.15 |
| 5,642,104 | 6/1997 | Erwin | 340/309.15 |

FOREIGN PATENT DOCUMENTS 3-277025 12/1991 Japan .

*Primary Examiner*—Brian Zimmerman
*Attorney, Agent, or Firm*—Scully, Scott, Murphy & Presser

[57] ABSTRACT

A radio selective calling receiver includes at least a loudspeaker, a function setting switch, a display unit, a timer, and a time-out display control section. The loudspeaker notifies an incoming call by generating a sound. The function setting switch is operated by a user to set various functions. The display unit displays a message accompanying the incoming call, and the set contents of a predetermined function of the various functions. The timer counts an elapsed time from the start of an operation of the function setting switch to the end of a time-out time. The time-out display control section causes the display unit to display a counted time, obtained by the timer, until the end of the time-out time.

11 Claims, 2 Drawing Sheets

DISPLAY OF TIMER FOR PROGRAMMING MODE OF A RADIO SELECTIVE CALLING RECEIVER

BACKGROUND OF THE INVENTION

1. Field of the Invention

The present invention relates to a radio selective calling receiver and, more particularly, to a radio selective calling receiver which performs time-out control in setting various functions.

2. Description of the Prior Art

A conventional radio selective calling receiver of this type allows a user to set various functions, e.g., time-of-day setting, alarm setting, stereotyped expression registration, and reception area setting, by operating a function setting switch. In the mode of setting these functions, i.e., the menu mode or the function setting mode, if the user does not perform a switching operation within a predetermined time interval (time-out time) for each setting operation (a time out occurs), the operation mode automatically shifts to the call wait state, i.e., time-out control is performed. A radio selective calling receiver designed to perform such time-out control is disclosed in Japanese Unexamined Patent Publication No. 3-277025 (the title of the invention: DISPLAY PAGER). When this receiver receives a message together with a call, and a predetermined period of time has elapsed (a time out occurs) without displaying (reading out) the message on the display section, the message is displayed on the display section, and the alarm circuit is caused to generate an alarm sound.

Time-out control in the function setting mode of the above conventional radio selective calling receiver is convenient control for the user. However, since the function setting mode abruptly ends, the user is confused in operating the function setting switch.

SUMMARY OF THE INVENTION

The present invention has been made in consideration of the above situation in the prior art, and has its object to provide a radio selective calling receiver which allows a user to easily recognize an operation margin period until the end of a time-out time in setting various functions.

In order to achieve the above object, according to the basic aspect of the present invention, there is provided a radio selective calling receiver including at least a loudspeaker for notifying an incoming call by generating a sound, a function setting switch which is operated by a user to set various functions, a display unit for displaying a message accompanying the incoming call, and set contents of a predetermined function of the various functions, and a timer for counting an elapsed time from the start of an operation of the function setting switch to the end of a time-out time, comprising time-out display control means for causing the display unit to display a counted time, obtained by the timer, until the end of the time-out time.

In the radio selective calling receiver according to the basic aspect, the counted time can be displayed by countdown display. In addition, the countdown display can be performed by either indicator display or 7-segment display.

According to another aspect of the present invention, there is provided a radio selective calling receiver further comprising time-out warning control means for causing the loudspeaker to give a warning by generating a sound when the end of the time-out time approaches.

The receiver according the above aspect may further comprise display changing means for changing contents displayed on the display unit when the end of the time-out time approaches.

As described above, the radio selective calling receiver of the present invention includes the timer for counting an elapsed time from the start of the operation of the function setting switch to the end of the time-out time in setting a predetermined function, and the time-out display control means for causing the display unit to display the counted time, obtained by the timer, until the time-out time. With this arrangement, the user can reliably recognize the end of the predetermined function setting mode at the end of the time-out time, thus preventing the abrupt end of the predetermined function setting mode, which confuses the user in performing a switch operation.

In addition, since the radio selective calling receiver includes the time-out warning control means for causing the loudspeaker to give a warning by generating a sound when the end of the time-out time approaches.

The above and many other advantages, features and additional objects of the present invention will become manifest to those versed in the art upon making reference to the following detailed description and accompanying drawings in which preferred embodiments incorporating the principles of the present invention are shown by way of illustrative example.

DETAILED DESCRIPTION OF THE PREFERRED EMBODIMENT

The present invention will be described below with reference to the embodiment shown in the accompanying drawings.

Figure 1:
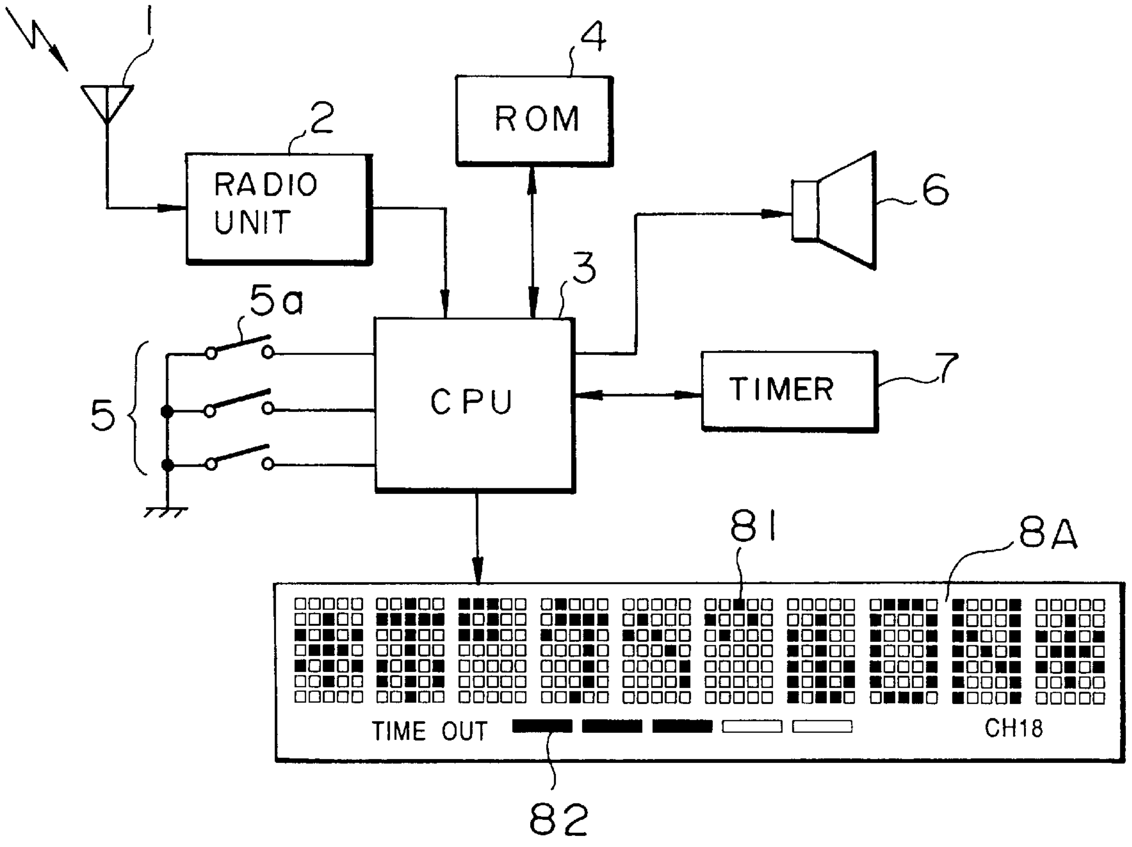
FIG. 1 is a block diagram showing the arrangement of an embodiment of the present invention.

FIG. 1 is a block diagram showing the arrangement of a radio selective calling receiver according to an embodiment of the present invention. Note that a display unit (LCD) 8A as the first example of the display unit in this embodiment shows a detailed display sample.

The radio selective calling receiver in FIG. 1 receives, through an antenna 1, a radio selective call signal from a base station in the paging system to which the receiver belongs. This radio selective call signal is demodulated and converted into a digital signal by a radio unit 2. This digital signal is input to a microprocessor (CPU) 3. The CPU 3 decodes the digital signal and compares the selective call signal contained therein with the self-selective call number written in a ROM 4. When they coincide with each other, the CPU 3 stores the message signal contained in the digital signal and following the selective call signal in the built-in memory, and drives a loudspeaker 6 to generate a sound, thereby notifying the callee, i.e., the user of this receiver, of the call.

When the user is to check the above message after the notification of the call, he/she operates a switch 5 to set the message display mode in the CPU 3, thereby causing the CPU 3 to perform message display control. In the message display mode, the CPU 3 displays the message corresponding to the message signal stored in the built-in memory on a message display screen 81 of an LCD 8A. Note that the message display screen 81 in FIG. 1 includes a dot matrix display screen for displaying messages, and a multi-screen indicator 82 for time-out display (to be described later).

Similar to receivers using conventional techniques, this radio selective calling receiver allows the user to set various functions, e.g., time-of-day setting, alarm setting, stereotyped expression registration, and reception area setting by operating the switch 5. In a predetermined function setting operation, the CPU 3 displays the set contents of the function on the message display screen 81 of the LCD 8A, like the display sample "*PAGER ON*" in FIG. 1. In setting the above functions, if the user does not operate the switch 5 within a predetermined time interval (time-out time) for each setting operation (a time out occurs), the CPU 3 automatically shifts the operation mode to the call wait state, i.e., performs time-out control.

The above time-out control will be described in detail. In the function setting mode, when the switch 5 is operated, the CPU 3 sets a predetermined time-out time for the function to be set, and starts a timer 7 to count an elapsed time until the end of the time-out time. When the switch 5 is operated within the time-out time, the CPU 3 resets the timer 7 to cause it to start counting again. The CPU 3 causes the indicator 82 to display the counted time. According to the display sample in FIG. 1, as the time is counted, the black portions of the indicator 82 reduces. When the time-out time is counted (a time out occurs), all the display portions of the indicator 82 change from black to white. That is, countdown display is performed.

When the end of the time-out time approaches, i.e., about one black display portion of the indicator 82 is left, the CPU 3 causes the loudspeaker 6 to generate a sound to warning about a time out. This warning by means of sound can be easily recognized if the form of producing this sound is different from that of call notification. Note that the CPU 3 may warn about a time out by flickering the message display screen 81 or changing the display symbols together with the above warning by means of sound.

As described above, the radio selective calling receiver of this embodiment performs warning by means of sound or warning by means of display near the end of the time-out time in the function setting mode. Therefore, the function setting mode does not end abruptly, and the operation of the function setting switch is clarified. In addition, since countdown display of the time until a time out is performed in the above warning operation by means of display, the user can immediately recognize the margin time allowed for the operation of the switch 5.

Figure 2:
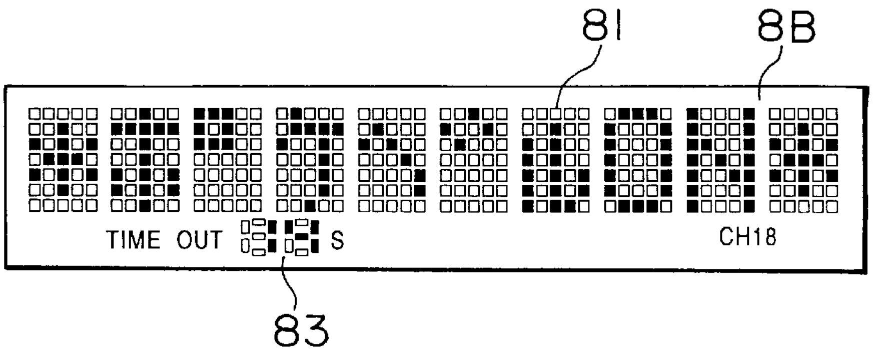
FIG. 2 is a plan view showing a modification of the display unit used in the embodiment of the present invention.

FIG. 2 shows the display surface of a display unit (LCD) 8B as the second example of the display unit in this embodiment.

This LCD 8B includes a message display screen 81 identical to that of the LCD 8A, and a segment display unit 83 for displaying the time counted by the timer 7 by operating 7-segment display elements. The segment display unit 83 can perform 7-segment display, and is displaying "14" s (seconds) in FIG. 2. As the end of the time-out time approaches, the CPU 3 displays a smaller number. At the end of the time-out time, the CPU 3 displays the number "0" to notify the user of the time out. This warning about a time out by means of 7-segment display provides the same effect as that provided by the warning operation by means of display in FIG. 1.

Figure 3:
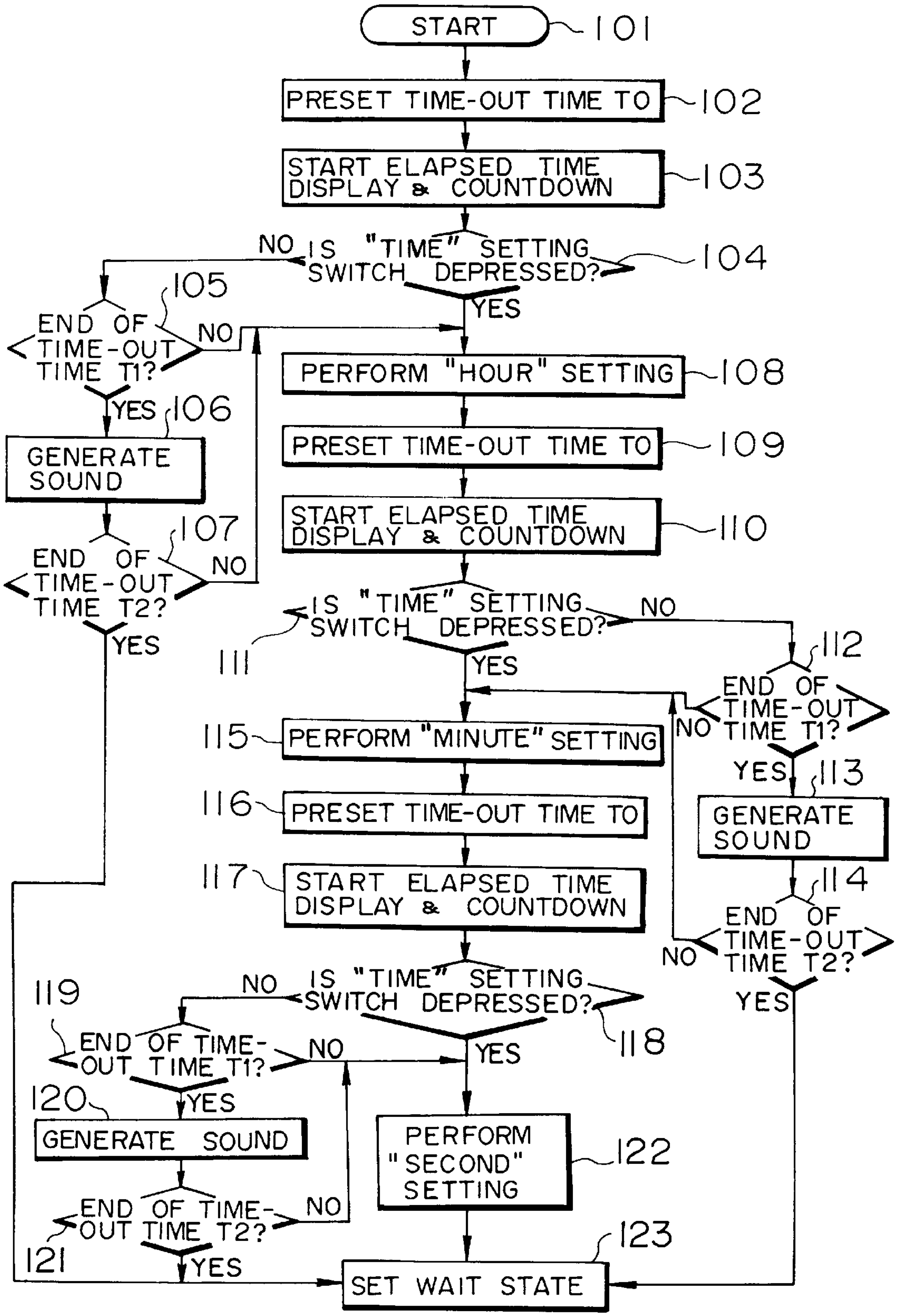
FIG. 3 is a flow chart showing a time-out control operation of the embodiment of the present invention.

FIG. 3 is a flow chart showing a time-out control operation in the embodiment in FIG. 1. Referring to FIG. 3, the time-of-day setting mode is set. That is, in this case, "hour", "minute", and "second" are set as the time of day in this radio selective calling receiver.

First of all, the user operates the switch 5 to cause the CPU 3 to start the time-of-day setting mode (step 101). The CPU 3 then presets the timer 7 for counting an elapsed time until a time-out time T0 for "hour" setting (step 102). At the same time, the CPU 3 causes the indicator 82 to display the elapsed time until the time out T0, and causes the timer 7 to start a countdown operation (step 103). Note that the CPU 3 causes the indicator 82 to display the elapsed time by properly dividing the plurality of display portions in accordance with the elapsed time until the time-out time T0.

When the user depresses the switch 5*a* assigned as a "time" setting switch (to be referred to as a "time" setting switch hereinafter) (YES in step 104), the CPU 3 performs "hour" setting (step 108). (In the actual receiver, the user must operate the switch 5 for adjustment to an arbitrary time before depressing the "time" setting switch 5*a*. However, this operation is not directly associated with the present invention, and hence a description thereof will be omitted). If it is determined in step 104 that the "time" setting switch 5*a* is not depressed (NO in step 104), the flow advances to step 105. The CPU 3 then determines the elapsed time from the start of monitoring of the timer 7 to the time-out time T0 (steps 105 to 107). That is, the CPU 3 has set two types of times, i.e., a time-out time T1 for warning about a time out, and a time-out time T2 as the time interval between the end of the time-out time T1 to the end of the time-out time T0 (T0=T1+T2). If the "time" setting switch 5*a* is not depressed before the lapse of the time-out time T1 (YES in step 105), the CPU 3 causes the loudspeaker 6 to generate a sound to warn about the approach of the end of the time-out time T0 (step 106). As described above, in step 106, the CPU 3 may warn about the approach of the end of the time-out time T0 by flickering the message display screen 81 or changing the display symbols together with warning by means of sound.

If the "time" setting switch 5*a* is not depressed before the lapse of the time-out time T2 after step 106 (YES in step 107), the CPU 3 terminates the time-of-day setting mode, and the receiver is set in the wait state (step 123). Note that this wait state includes the call wait state and the message wait state. If the user depresses the "time" setting switch 5*a* before the lapse of the time-out time T1 and the time-out time T2, i.e., before YES is obtained in steps 105 and 107, the CPU 3 performs "hour" setting, as described above (step 108).

When "hour" setting is completed in steps 104 and 108, the flow shifts to the "minute" setting mode. That is, the CPU 3 presets a time-out time for "minute" setting in the timer 7 (step 109). Subsequently, the user operates the switch 5 to set/input data, and the receiver sequentially performs "minute" setting and "second" setting by the same procedure as that for "hour" setting (steps 110 to 123).

What is claimed is:

1. A radio selective calling receiver comprising:

a switch for setting one or more functions of the receiver, the functions being peripheral to a wait state of the receiver, the wait state comprising a message wait state and a call wait state;

a display unit for displaying a message accompanying an incoming call and a message identifying a function to be set in response to operation of the switch;

a notify unit for notifying of an incoming call;

a timer for counting an elapsed time for setting one of the functions from a start time to an end time, after which the receiver returns to the wait state; and a control means for causing the display unit to display the counting of the elapsed time.

2. The receiver of claim 1 wherein the display unit includes a first display for displaying the incoming call message and a second display for displaying the elapsed time.

3. The receiver of claim 2 wherein said second display is an indicator display.

4. The receiver of claim 2 wherein said second display is a multi-segment display.

5. The receiver of claim 1 wherein the notify unit includes a vibrating device and a sound device for notifying of the incoming call and of the elapsed time.

6. The receiver of claim 5 further comprising elapsed time warning means for warning when the elapsed time approaches the end time.

7. The receiver of claim 6 wherein said elapsed time warning means causes an audible alarm to sound.

8. The receiver of claim 6 wherein said elapsed time warning means causes a vibration alarm.

9. The receiver of claim 6 wherein said elapsed time warning means causes said second display to flicker.

10. The receiver of claim 1 wherein said timer for counting an elapsed time for setting one of the functions from a start time to an end time, counts down the elapsed time before a warning and counts down the elapsed time after the warning.

11. The receiver of claim 10 wherein the time for performing an operation is T0, the time before the warning is T1 and the time after the warning is T2, where T1+T2=T0.

* * * * *